United States Patent
Riffe et al.

(10) Patent No.: US 10,968,862 B2
(45) Date of Patent: Apr. 6, 2021

(54) MONOLITHIC, GALLERYLESS PISTON AND METHOD OF CONSTRUCTION THEREOF

(71) Applicant: Federal-Mogul LLC, Southfield, MI (US)

(72) Inventors: Jeff Riffe, Troy, MI (US); Michael Weinenger, Southfield, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 16/110,874

(22) Filed: Aug. 23, 2018

(65) Prior Publication Data

US 2019/0003418 A1 Jan. 3, 2019

Related U.S. Application Data

(63) Continuation of application No. 14/940,416, filed on Nov. 13, 2015, now Pat. No. 10,094,327, which is a
(Continued)

(51) Int. Cl.
*F02F 3/00* (2006.01)
*F02F 3/16* (2006.01)
*B23P 15/10* (2006.01)

(52) U.S. Cl.
CPC .............. *F02F 3/16* (2013.01); *B23P 15/10* (2013.01); *F02F 3/00* (2013.01); *F02F 3/0069* (2013.01);
(Continued)

(58) Field of Classification Search
CPC ................. F02F 3/00; F02F 2003/0007; F05C 2201/0448; F16J 1/001; F16J 1/08
(Continued)

(56) References Cited

U.S. PATENT DOCUMENTS 1,286,021 A * 11/1918 Anderson ........................ 43/124
4,704,950 A 11/1987 Ripberger et al.
(Continued)

FOREIGN PATENT DOCUMENTS

| | | |
|---|---|---|
| JP | S61058954 A | 3/1986 |
| JP | S63074560 U | 5/1988 |

(Continued)

*Primary Examiner* — Long T Tran
*Assistant Examiner* — James J Kim
(74) *Attorney, Agent, or Firm* — Robert L. Stearns; Dickinson Wright, PLLC

(57) ABSTRACT

A galleryless piston for an internal combustion engine is provided. The piston has a monolithic piston body including an upper wall forming an upper combustion surface with first and second portions. The first portion extends annularly along an outer periphery of the upper wall and the second portion includes a combustion bowl. The first portion can also include valve pockets formed therein to reduce weight. The upper wall has an undercrown surface directly opposite the second portion of the upper combustion surface. To enhance cooling, a center portion of the undercrown surface is concave, such that oil is channeled during reciprocation of the piston from one side to the opposite side of the piston. The concave center portion is axially offset from the surrounding area of the undercrown surface.

19 Claims, 2 Drawing Sheets

Related U.S. Application Data continuation of application No. 14/535,839, filed on Nov. 7, 2014, now Pat. No. 9,869,268.

(60) Provisional application No. 61/901,287, filed on Nov. 7, 2013, provisional application No. 62/011,876, filed on Jun. 13, 2014.

(52) U.S. Cl.
CPC .... F02F 3/0092 (2013.01); *F02F 2003/0007* (2013.01); *Y10T 29/49265* (2015.01)

(58) Field of Classification Search
USPC .......... 123/193.6, 193.4, 41.35; 92/186, 208, 92/237
See application file for complete search history.

(56) References Cited

U.S. PATENT DOCUMENTS

| | | | | |
|---|---|---|---|---|
| 4,989,559 | A * | 2/1991 | Fletcher-Jones | F02F 3/0076 123/193.6 |
| 6,152,016 | A * | 11/2000 | Bahr | F02F 3/00 92/160 |
| 6,938,603 | B2 | 9/2005 | Scharp | |
| 7,895,937 | B2 * | 3/2011 | Frank | F16J 1/16 92/237 |
| 7,954,421 | B2 * | 6/2011 | Buschbeck | F02F 3/0076 92/238 |
| 8,677,970 | B2 * | 3/2014 | Venugopal | F02B 23/0651 123/193.1 |
| 2004/0261612 | A1 * | 12/2004 | Gillman | F02F 3/0076 92/186 |
| 2008/0105118 | A1 | 5/2008 | Frank et al. | |
| 2008/0216790 | A1 * | 9/2008 | Breidenbach | F02F 3/0084 123/193.4 |
| 2008/0264376 | A1 * | 10/2008 | Braig | F02F 3/00 123/193.6 |
| 2009/0151688 | A1 | 6/2009 | Matsui et al. | |
| 2009/0188464 | A1 * | 7/2009 | Dettori | F16J 1/16 123/193.6 |
| 2010/0139480 | A1 * | 6/2010 | Ohmori | F16J 1/001 92/239 |
| 2010/0229820 | A1 * | 9/2010 | Iwata | F02F 3/00 123/193.6 |
| 2010/0307446 | A1 * | 12/2010 | Nodl | F02F 3/00 123/193.6 |
| 2011/0139114 | A1 * | 6/2011 | Nakazawa | F02F 3/105 123/193.6 |
| 2011/0174153 | A1 * | 7/2011 | Hettich | F02F 3/0076 92/172 |
| 2012/0234285 | A1 | 9/2012 | Venugopal et al. | |
| 2012/0260882 | A1 * | 10/2012 | Martins | F02F 3/26 123/193.6 |
| 2013/0032120 | A1 | 2/2013 | Claver et al. | |
| 2013/0233270 | A1 * | 9/2013 | Brandt | F02F 3/00 123/193.6 |
| 2017/0363040 | A1 * | 12/2017 | Brown | F16J 1/001 |
| 2018/0051650 | A1 * | 2/2018 | Loew | F02F 3/24 |
| 2020/0080509 | A1 * | 3/2020 | Haberl | F02F 3/0076 |

FOREIGN PATENT DOCUMENTS

| | | |
|---|---|---|
| JP | 2006214298 A | 8/2006 |
| JP | 2007500608 A | 1/2007 |
| JP | 2007309477 A | 11/2007 |
| JP | 2010509529 A | 3/2010 |

* cited by examiner

MONOLITHIC, GALLERYLESS PISTON AND METHOD OF CONSTRUCTION THEREOF

CROSS-REFERENCE TO RELATED APPLICATION

This U.S. Continuation Patent Applications claims the benefit of U.S. Continuation patent application Ser. No. 14/940,416, filed Nov. 13, 2015, and the benefit of U.S. Utility Ser. No. 14/535,839, filed Nov. 7, 2014 and which issued on Jan. 16, 2018 as U.S. Pat. No. 9,869,268, which claims the benefit of U.S. Provisional Application No. 61/901,287, filed Nov. 7, 2013, and claims the benefit of U.S. Provisional Application No. 62/011,876, filed Jun. 13, 2014, which are each incorporated herein, by reference, in their entirety.

BACKGROUND OF THE INVENTION

1. Technical Field

This invention relates generally to internal combustion engines, and more particularly to pistons therefor.

2. Related Art

Engine manufacturers are encountering increasing demands to improve engine efficiencies and performance, including, but not limited to, improving fuel economy, reducing oil consumption, improving fuel systems, increasing compression loads and operating temperatures within the cylinder bores, reducing heat loss through the piston, improving lubrication of component parts, decreasing engine weight and making engines more compact, while at the same time decreasing the costs associated with manufacture. While desirable to increase the compression load and operation temperature within the combustion chamber, it remains necessary to maintain the temperature of the piston within workable limits. Accordingly, although desirable to increase the compression load and operation temperature within the combustion chamber, achieving this goal comes with a tradeoff in that these desirable "increases" limit the degree to which the piston compression height, and thus, overall piston size and mass can be decreased. This is particularly troublesome with typical piston constructions having a closed or partially closed cooling gallery to reduce the operating temperature of the piston. Further, the cost to manufacture pistons having upper and lower parts joined together along a bond joint to form the closed or partially closed cooling gallery is generally increased due to the joining process used to bond the upper and lower parts together. Further, the degree to which the engine weight can be reduced is impacted by the need to make the aforementioned "cooling gallery-containing" pistons from steel so they can withstand the increase in mechanical and thermal loads imposed on the piston.

SUMMARY OF THE INVENTION

A piston constructed in accordance with this invention overcomes the aforementioned disadvantages of known piston constructions and other disadvantages, as will become apparent to those skilled in the art upon reading the disclosure and viewing the drawings herein.

The piston is constructed of a monolithic piece of steel, thereby providing the piston with enhanced strength and durability to withstand increased compression loads and temperatures within a cylinder bore, such as those loads and temperatures seen in modern high performance engines. Further, due to the novel single piece configuration of the piston, the costs associated with manufacture of the piston are reduced in that the typical processes used to join piston upper and lower parts together are not employed. Further, in a piston constructed in accordance with the invention, the compression height (CH) and weight of the piston are able to be significantly reduced relative to a piston including a closed or partially closed cooling gallery, particularly since the piston does away with the presence of a floor commonly used to form a cooling gallery, thereby allowing an engine in which the pistons are deployed to be made more compact, lightweight and fuel efficient.

In accordance with one aspect of the invention, a galleryless piston for an internal combustion engine is provided. The piston has a monolithic piston body extending along a central longitudinal axis with an upper wall forming an upper combustion surface and an annular ring belt region depending from the upper combustion surface. The upper combustion surface has first and second portions, wherein the first portion extends annularly along an outer periphery of the upper wall and the second portion forms a combustion bowl depending radially inwardly from the first portion. The upper wall also has an undercrown surface formed on an underside thereof. The undercrown surface is located directly opposite the second portion of the upper combustion surface. The piston body also includes a pair of skirt portions depending from the ring belt region, and a pair of pin bosses spaced from one another by the skirt portions and providing a pair of laterally spaced pin bores. The piston body is free of a cooling gallery along the undercrown surface between the skirt portions and pin bosses. Thus, the undercrown surface comprises an expansive area for contact by cooling oil while the piston is in use. To further enhance cooling of the piston, the undercrown surface includes a concave center portion located along the central longitudinal axis which channels oil from one side of the piston to the opposite side.

In accordance with another aspect of the invention, a method of constructing a galleryless piston for an internal combustion engine is provided. The method includes forming a monolithic piston body by at least one of a machining, forging and casting process. The piston body extends along a central longitudinal axis and has an upper wall forming an upper combustion surface with an annular ring belt region depending from the upper combustion surface. The upper combustion surface has first and second portions, the first portion extending annularly along an outer periphery of the upper wall and the second portion forming a combustion bowl depending radially inwardly from the first portion. The upper wall also has an undercrown surface formed on an underside thereof. The undercrown surface is located directly opposite the second portion of the upper combustion surface. The piston body also includes a pair of skirt portions depending from the ring belt region, and a pair of pin bosses spaced from one another by the skirt portions and providing a pair of laterally spaced pin bores. The piston body is free of a cooling gallery along the undercrown surface between the skirt portions and pin bosses, and the undercrown surface includes a concave center portion located along the central longitudinal axis.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION

Figure 1:
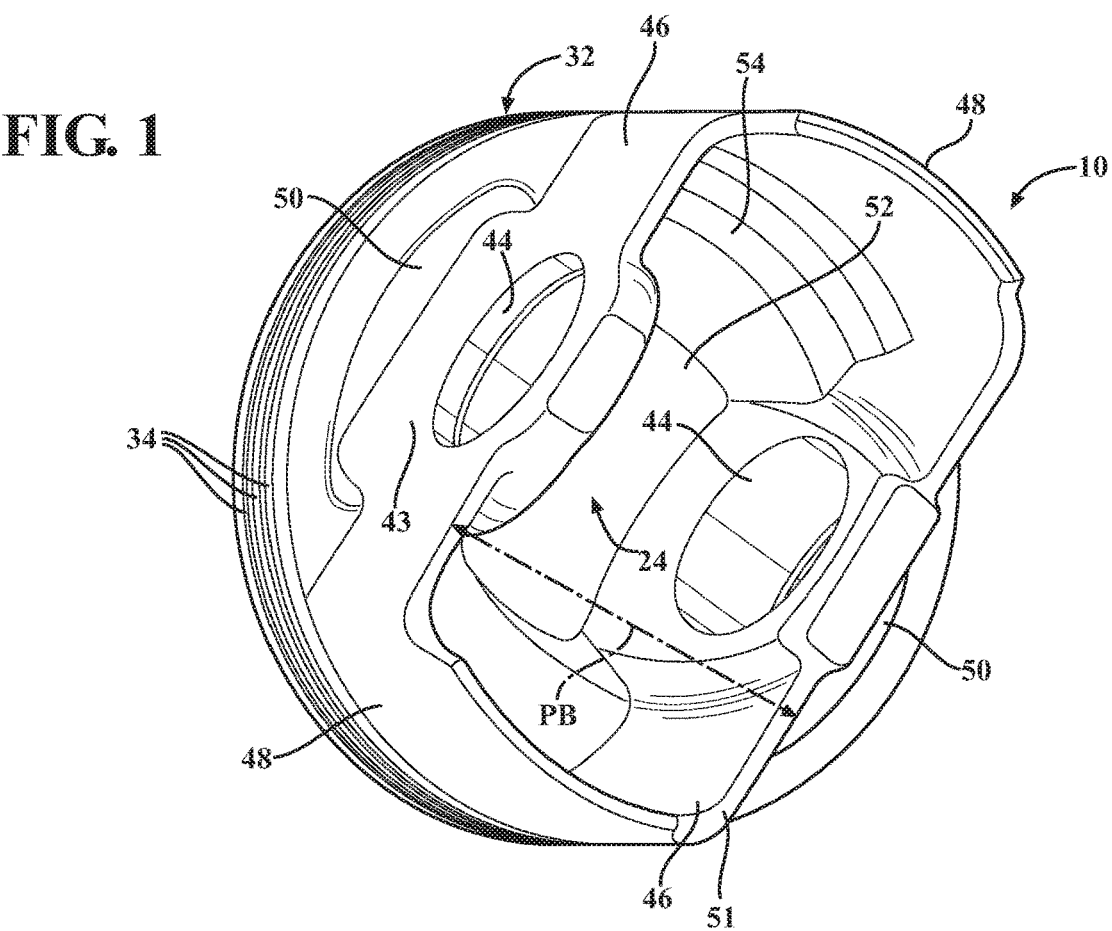
FIG. 1 is a bottom perspective view of a piston constructed in accordance with an embodiment of the invention.
Figure 2:
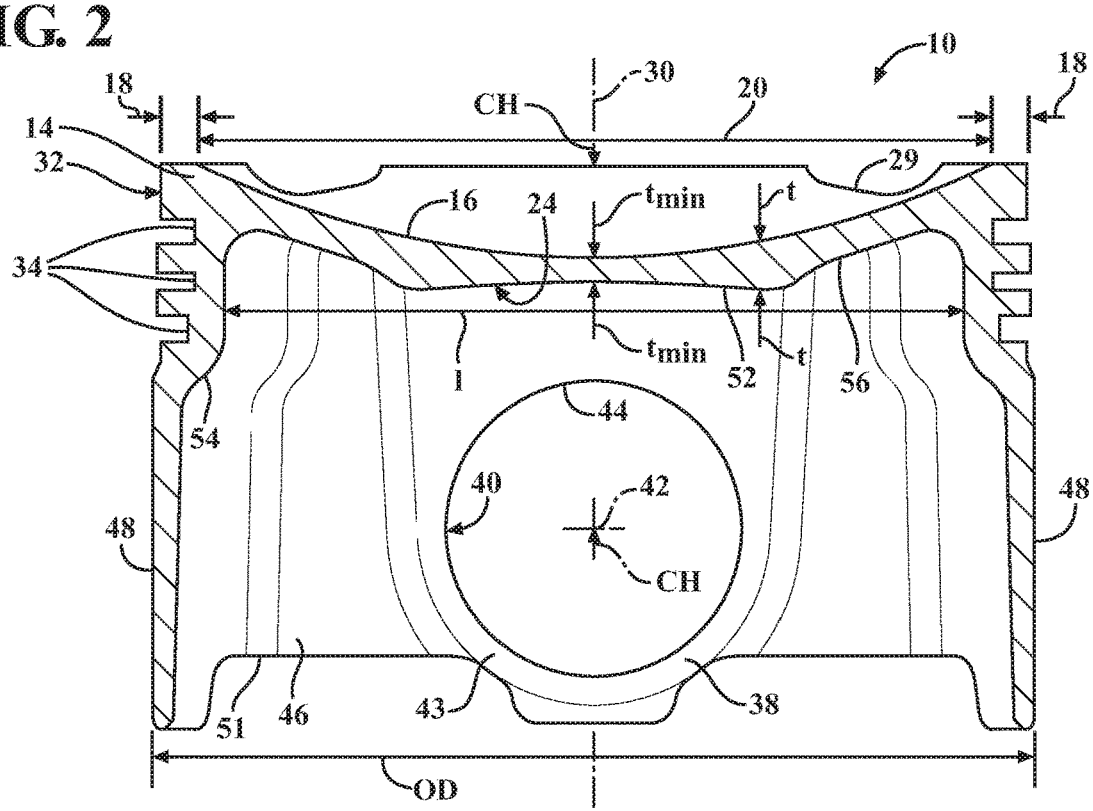
FIG. 2 is a cross-sectional view taken generally transversely to a pin bore axis of a piston in accordance with an embodiment of the invention.
Figure 3:
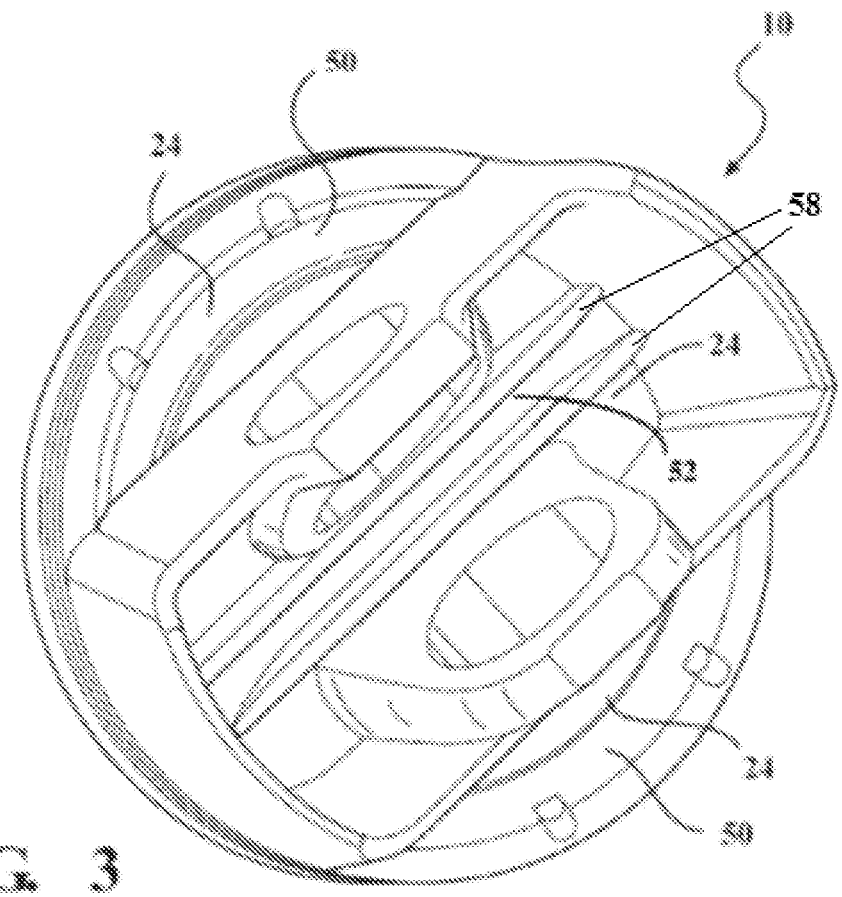
FIG. 3 is a bottom perspective view of a piston constructed in accordance with another embodiment of the invention.

Referring in more detail to the drawings, FIGS. 1-3 illustrate views of a piston 10 constructed in accordance with example embodiments of the invention for reciprocating movement in a cylinder bore or chamber (not shown) of an internal combustion engine, such as a modern, compact, high performance vehicle engine, for example. The piston 10 is constructed having a monolithic body formed from a single piece of material, such as via machining, forging or casting, with possible finish machining performed thereafter, if desired, to complete construction. Accordingly, the piston 10 does not have a plurality of parts joined together, such as upper and lower parts joined to one another, which is commonplace with pistons having enclosed or partially enclosed cooling galleries bounded or partially bounded by a cooling gallery floor. To the contrary, the piston 10 is "galleryless" in that it does not have a cooling gallery floor or other features bounding or partially bounding a cooling gallery. The piston body, being made of steel, is strong and durable to meet the high performance demands, i.e. increased temperature and compression loads, of modern day high performance internal combustion engines. The steel (i.e., the steel alloy) used to construct the body can be SAE 4140 grade or different, depending on the requirements of the piston 10 in the particular engine application. Due to the piston 10 being galleryless, and the novel configuration of the body, among other things discussed below, minimizes the weight and compression height (CH) of the piston 10, thereby allowing an engine in which the pistons 10 are deployed to achieve a reduced weight and to be made more compact. Further yet, even though being galleryless, the novel construction discussed below and shown in the Figures allows the piston 10 to be sufficiently cooled during use to withstand the most severe operating temperatures.

The piston body has an upper head or top section providing a top wall, also referred to as upper wall 14, which provides an upper combustion surface 16 that is directly exposed to combustion gasses within the cylinder bore of the internal combustion engine. The upper combustion surface 16 includes an annular first portion 18 formed as a substantially planar surface extending along an outer periphery of the upper wall 14 and a second portion 20 forming a combustion bowl. The second portion 20 of the upper combustion surface 16, which forms the combustion bowl, has a non-planar, concave, or undulating surface that depends from the planar first portion 18. An undercrown surface 24 is formed on an underside of the upper wall 14, directly opposite the second portion 20 of the upper combustion surface 16. The undercrown 24 is defined here to be the surface that is visible, excluding the pin bores 40, when observing the piston 10 straight on from the bottom. The second portion 20 of the upper wall 14 has a thickness t extending from the upper combustion surface 16 to the underside of the upper wall 14. The portion of the underside of the upper wall 14 which is considered to be the undercrown surface 24 is a portion that extends to a distance away from the second portion 20 of the upper combustion surface 16 no more than two times the minimum thickness $t_{min}$ of the upper wall 14 along the second portion 20. Accordingly, the undercrown surface 24 is generally form fitting to the combustion bowl of the upper combustion surface 16. The undercrown surface 14 is locate at a minimum distance from the combustion bowl and is substantially the surface on the opposite side from the combustion bowl. The undercrown surface 24 is openly exposed, as viewed from an underside of the piston 10, and it is not bounded by an enclosed or partially enclosed cooling gallery, or any other features tending to retain oil or a cooling fluid near the undercrown surface.

The annular first portion 18 of the upper wall 14 forms an outer periphery of the upper wall 14 and surrounds the second portion forming the combustion bowl, which depends therefrom. Thus, the second portion 20, including the combustion bowl, is recessed below the uppermost first portion 18 of the upper combustion surface 16. In the example embodiments, at least one valve pocket 29 having a curved profile is formed in the annular first portion 18 of the upper wall 14. The valve pocket 29 reduces mass and thus can improve performance of the piston 10.

In the example embodiment, the combustion bowl of the second portion 20 of the upper wall 14 extends continuously through a central axis 30 and across the entire diameter of the piston 10, between opposite sides of the annular first portion 18. The combustion bowl can comprise a concave surface extending continuously between the opposite sides of the annular first portion 18. Alternatively, the combustion bowl wall can be contoured, for example to provide an upper apex, also referred to as center peak (not shown), which may lie coaxially along the central axis 30 of the piston 10, or may be radially offset relative to the piston central axis 30. The top section of the piston 10 further includes a ring belt region 32 that depends from the upper combustion surface 16 to provide one or more ring grooves 34 for receipt of one or more corresponding piston rings (not shown).

The piston body further includes a bottom section including a pair of pin bosses 38 depending generally from the upper wall 14. The pin bosses 38 each have a pin bore 40, preferably bushingless given the steel construction, wherein the pin bores 40 are laterally spaced from one another coaxially along a pin bore axis 42 that extends generally transversely to the central longitudinal axis 30. The pin bosses 38 have generally flat, radially outermost surfaces, referred to as outer faces 43, that are spaced from one another along the pin bore axis 40 a distance PB, shown as being generally parallel with one another. The PB dimension is minimized, thereby maximizing an exposed area of a recessed, generally cup-shaped region, referred to hereafter as undercrown pockets 50. The undercrown pockets 50 are located radially outwardly of the pin bosses 38 and form a portion of the undercrown surface 24. The undercrown pockets 50 also extend radially outwardly beyond the undercrown surface 24 along an underside surface of the annular first portion 18 of the upper combustion surface 16 and depend from the upper wall 14 along an inner surface of the ring belt region 32. As such, with the 2-dimensional and 3-dimensional surface area of the pockets 50 being maximized, at least in part due to the minimized distance PB, the cooling caused by oil splashing or being sprayed upwardly from the crankcase against the exposed surface of the undercrown pockets 50 is enhanced, thereby lending to further cooling of the upper combustion surface 16, the undercrown 24, as well as a portion of the ring belt region 34.

The pin bores 40 each have a concave uppermost load bearing surface, referred to hereafter as uppermost surface 44, disposed near the ring belt region 32. As such, the compression height CH is minimized (the compressing height is the dimension extending from the pin bore axis 42 to the upper combustion surface 16). The pin bosses 38 are joined via outer panels, also referred to as struts 46, to diametrically opposite skirt portions, also referred to as skirt panels 48.

The pin bosses 38, skirt panels 48 and struts 46 bound an open region extending from a lowermost or bottom surface 51 of the struts 46 and skirt panels 48 to the undercrown surface 24. In the example embodiment of FIGS. 1 and 2, there are no ribs located along the undercrown surface 24, along the pin bosses 38, along the skirt panels 48, or along the struts 46 in the open region. In addition, no closed or partially closed cooling gallery is formed in the open region. However, the piston 10 can include a stepped region 54 along the uppermost edge of each skirt panel 48 adjacent the undercrown surface 24. The stepped regions 54 provide additional material so that the ring belt region 32 can be formed in the upper part of the piston 10. In the example embodiment, the stepped regions 54 are not considered part of the undercrown surface 24. In another embodiment, for example the embodiment shown in FIG. 3, the piston 10 does include a pair of ribs 58 along the undercrown surface 24 to enhance cooling. The ribs 58 extend continuously along the undercrown surface 24 between the opposite skirt panels 38.

The open region along the underside of the piston 10 provides direct access to oil splashing or being sprayed from within the crankcase directly onto the undercrown surface 24, thereby allowing the entire undercrown surface 24 to be splashed directly by oil from within the crankcase, while also allowing the oil to freely splash about the wrist pin (not shown), and further, significantly reduce the weight of the piston 10. Accordingly, although not having a typical closed or partially closed cooling gallery, the generally open configuration of the galleryless piston 10 allows optimal cooling of the undercrown surface 24 and lubrication to the wrist pin joint within the pin bores 40, while at the same time reducing oil residence time on the surfaces near the combustion bowl, which is the time in which a volume of oil remains on the a surface. The reduced residence time can reduce unwanted build-up of coked oil, such as can occur in pistons having a closed or substantially closed cooling gallery. As such, the piston 10 remains "clean" over extended use, thereby allowing it to remain substantially free of debris build-up.

Owing to the optimal cooling of the undercrown surface 24 is the percentage of the undercrown surface 24 directly underlying the upper combustion surface 16 that is directly exposed to the splashing and sprayed oil from the crankcase. The undercrown surface 24 of the piston 10 has greater a total surface area (3-dimensional area following the contour of the surface) and a greater projected surface area (2-dimensional area, planar, as seen in plan view) than comparative pistons having a closed or partially closed cooling gallery.

In one embodiment, the undercrown surface 24 has a total exposed surface area, defined as the 3-dimensional area following the contour of the undercrown surface 24 that is greater than 40 percent of, and between about 40-90 percent of the area of the cylinder bore, and thus, between about 40-90 percent of the 2-dimensional area defined by the maximum outer diameter OD of the piston 10 (i.e., 40% of $\pi D^2/4$, where D is the maximum outer diameter OD). The undercrown surface 24 can also have a projected surface area, defined as the 2-dimensional area seen looking generally along the central longitudinal axis 30 from the bottom of the piston 10 between about 35-60 percent of the area of the cylinder bore, and thus, between about 35-60 percent of the area defined by the maximum outer diameter OD of the piston 10. Further yet, the exposed area of the undercrown surface 24 can have a length l, as shown in FIG. 2, between about 75-90 percent of the diameter of the cylinder bore, and thus, between about 75-90 percent of the maximum outer diameter OD of the piston 10. Further yet, the exposed area of the undercrown surface 24 can have a length l between about 85-140 percent of the diameter CD of the combustion bowl, which is in contrast to a maximum of 100 percent for a piston having a closed or substantially closed cooling gallery. However, the percentages of relative surface areas and relative lengths and diameters can vary from the ranges disclosed above while still provide for enhanced cooling. The percentages of relative surface areas and relative lengths of the exposed undercrown surface 24 of the piston 10 are far in excess of conventional pistons, and in some cases, are upwards to 3 times greater or more. As such, the upper combustion surface 16 can be cooled directly via oil splashing upwardly from the crankcase, which can be coupled with the assistance from oil jets, if desired.

As mentioned above, the undercrown pockets 50 of the piston 10 define at least a portion of the undercrown surface 24, as well as a portion of an underside of the first portion 18 and a portion of an inner surface of the annular ring belt region 32. In one embodiment, the undercrown pockets 50 have a total 3-dimensional surface area between about 45-85 percent of the maximum 2-dimensional area of the piston 10. However, the 2-dimensional and 3-dimensional surface area of the undercrown pockets 50 can vary from the ranges disclosed above while still being able to contribute significantly to the cooling of the regions of the upper combustion surface 16 located directly above the pockets 50.

In accordance with another aspect of the invention, at least a center portion 52 of the undercrown surface 24 of the piston 10 disposed between the opposite skirt panels 38 and the opposite pin bosses 38 is concave in form, when viewing from the bottom of the piston 10. As such, oil is channeled during reciprocation of the piston 10 from one side of the piston 10 to the opposite side of the piston 10, thereby acting to further enhance cooling of the piston 10. This concave center portion 52 has a length L extending longitudinally between the skirt panels 38 and a width W extending between the pin bosses 38. The length L of the concave center portion 52 is typically greater than the width W. In the example embodiment shown in FIG. 2, the concave center portion 52 is axially offset from the surrounding area 56 of the undercrown surface 24. For example, the concave center portion 52 can be disposed closer to the pin bosses 38 than the surrounding area 56. In the example embodiment of FIG. 3, the concave center portion 52 extends longitudinally between the opposite skirt panels 38, and the ribs 58 are disposed on opposite sides of the concave center portion 52. In other words, the ribs 58 separate at least a portion of the concave center portion 52 from the pin bosses 38.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A piston for an internal combustion engine, comprising:
   a piston body extending along a central longitudinal axis;

said piston body having an upper wall forming an upper combustion surface with a ring belt region depending from said upper combustion surface;

said upper wall having an undercrown surface formed on an underside thereof;

said piston body including a pair of skirt portions depending from said ring belt region;

said piston body including a pair of pin bosses spaced from one another each of said pin bosses including an inner surface facing toward said central longitudinal axis and an outer surface facing away from said central longitudinal axis, and each of said pin bosses providing a pin bore extending continuously from said inner surface to said outer surface;

a pair of laterally spaced struts extending between and joining said pin bosses to said skirt portion;

said piston body being free of a cooling gallery along said undercrown surface between said skirt portions and pin bosses;

said undercrown surface including undercrown pockets formed between said outer surfaces of said pin bosses and an inner surface of said ring belt region, and said undercrown pockets defining a portion of said undercrown surface; and said piston body including a pair of ribs disposed between said pin bosses and extending along said undercrown surface between said skirt portions and spaced laterally inwardly of said struts at said skirt portions.

2. The piston of claim 1, wherein said undercrown surface includes a concave center portion located along said central longitudinal axis, said concave center portion has a length extending longitudinally between said skirt panels and a width extending between said pin bosses, and the length of said concave center portion is greater than the width.

3. The piston of claim 2, wherein said concave center portion is spaced from said central longitudinal axis.

4. The piston of claim 3, wherein said undercrown surface includes a surrounding area around said concave center portion, and said concave center portion is disposed closer to said pin bosses than said surrounding area.

5. The piston of claim 1, wherein at least one valve pocket having a curved profile is formed in said first portion of said upper wall.

6. The piston of claim 1, wherein said piston body includes a stepped region along an uppermost edge of each of said skirt panels adjacent said undercrown surface.

7. The piston of claim 6, wherein said stepped regions do not form a portion of said undercrown surface.

8. The piston of claim 1, wherein said ribs extend from a first one of said skirt portions toward a second one of said skirt portions.

9. The piston of claim 1, wherein said ribs extend continuously from said first one of said skirt portions to said second one of said skirt portions.

10. The piston of claim 1, wherein said piston body is formed of steel.

11. The piston of claim 2, wherein said undercrown surface includes a surrounding area around said concave center portion, and said concave center portion of said undercrown surface has a length extending longitudinally between said skirt panels and a width extending between said pin bosses, wherein the length of said concave center portion is greater than the width; said concave center portion is spaced from said central longitudinal axis said concave center portion is disposed closer to said pin bosses than said surrounding area; at least one valve pocket having a curved profile is formed in a first portion of said upper wall; said piston body includes a stepped region along an uppermost edge of each of said skirt panels adjacent said undercrown surface, and said stepped regions do not form a portion of said undercrown surface; said piston body presents a thickness extending from said upper combustion surface to an underside of said upper wall, said undercrown surface is a portion of said underside, and said undercrown surface is located a distance away from a second portion of said upper combustion surface; and said piston body is formed of steel.

12. A piston for an internal combustion engine, comprising:

a monolithic piston body extending along a central longitudinal axis;

said piston body having an upper wall forming an upper combustion surface with a ring belt region depending from said upper combustion surface;

said upper combustion surface having first and second portions, said first portion extending along an outer periphery of said upper wall and said second portion forming a combustion bowl depending radially inwardly from said first portion;

said upper wall having an undercrown surface formed on an underside thereof, said undercrown surface being located opposite said second portion of said upper combustion surface;

said piston body including a pair of skirt portions depending from said ring belt region;

said piston body including a pair of pin bosses spaced from one another by said skirt portions, each of said pin bosses including an inner surface facing toward said central longitudinal axis, and each of said pin bosses providing a pin bore extending continuously from said inner surface to said outer surface;

said piston body being free of a cooling gallery along said undercrown surface between said skirt portions and pin bosses;

said undercrown surface including a concave center portion located along said central longitudinal axis and between said pin bosses;

said undercrown surface having an exposed 2-dimensional area when viewed from an underside of said piston, wherein said exposed 2-dimensional area has a length between about 75-90 percent of a maximum outer diameter of said piston body; and said undercrown surface including undercrown pockets formed between said outer surfaces of said pin bosses and an inner surface of said ring belt region, and said undercrown pockets defining a portion of said undercrown surface, and said piston body including a pair of ribs disposed between said pin bosses and extending along said undercrown surface between said skirt portions and spaced laterally inwardly of said struts at said skirt portions.

13. A method of constructing piston, comprising the steps of:

forming a piston body by at least one of a machining, forging and casting process, the piston body extending along a central longitudinal axis and having an upper wall forming an upper combustion surface with a ring belt region depending from the upper combustion surface, the upper wall having an undercrown surface formed on an underside thereof, the piston body including a pair of skirt portions depending from the ring belt region, the piston body including a pair of pin bosses spaced from one another by the skirt portions, each of the pin bosses including an inner surface facing toward the central longitudinal axis and an outer surface facing away from the central longitudinal axis, and each of the pin bosses providing a pin bore extending continuously from the inner surface to the outer surface, the piston body being free of a cooling gallery along the undercrown surface between the skirt portions and pin bosses, the undercrown surface including undercrown pockets fanned between the outer surfaces of the pin bosses and an inner surface of the ring belt region, and the undercrown pockets defining a portion of the undercrown surface, and the piston body including a pair of ribs extending along the undercrown surface between the skirt portions and passing between the pin bosses.

14. The method of claim 13, wherein the undercrown surface includes a concave center portion located along the central longitudinal axis, and the forming step includes machining the concave center portion of the undercrown surface after casting the piston body.

15. The method of claim 14, wherein the concave center portion has a length extending longitudinally between the skirt panels and a width extending between the pin bosses, and wherein the step of machining the concave center portion includes forming the length of the concave center portion greater than the width.

16. The method of claim 14, wherein the step of machining the concave center portion includes forming the concave center portion spaced from the central longitudinal axis.

17. The method of claim 13 wherein the forming step includes forming at least one valve pocket having a curved profile in the first portion of the upper wall.

18. The method of claim 13, wherein the forming step includes a stepped region along an uppermost edge of each of the skirt panels adjacent the undercrown surface.

19. The method of claim 14, wherein the undercrown surface includes a surrounding area around the concave center portion, and the concave center portion of the undercrown surface has a length extending longitudinally between the skirt panels and a width extending between the pin bosses, wherein the length of the concave center portion is greater than the width, the concave center portion is spaced from the central longitudinal axis, and the concave center portion is disposed closer to the pin bosses than the surrounding area; wherein the piston body provided during the forming step is formed of steel and further includes at least one valve pocket having a curved profile in the first portion of the upper wall, a stepped region along an uppermost edge of each of the skirt panels adjacent the undercrown surface which does not form a portion of the undercrown surface; wherein the skirt panels, and the pin bosses; and wherein the piston body provided during the forming step presents a thickness extending from the upper combustion surface to an underside of the upper wall, the undercrown surface is a portion of the underside which is located a distance away from a portion of the upper combustion surface, and wherein the measure of the distance is no more than two times the measure of the minimum thickness of the upper wall along the second portion.

* * * * *